United States Patent [19]
Livingston et al.

[11] Patent Number: 5,741,042
[45] Date of Patent: Apr. 21, 1998

[54] INTERMODAL CONTAINER INCLUDING DOUBLE LAP SHEAR JOINTS

[75] Inventors: Douglas R. Livingston; Brent G. Schaffer, both of Janesville; Randall V. Guest, Albany, all of Wis.

[73] Assignee: Stoughton Composites, Inc., Brodhead, Wis.

[21] Appl. No.: 409,471

[22] Filed: Mar. 23, 1995

[51] Int. Cl.⁶ .................................................. B62D 33/00
[52] U.S. Cl. .......................... 296/187; 296/181; 296/29; 296/901; 220/1.5; 52/309.1
[58] Field of Search .............................. 296/181, 901, 296/183, 187, 191, 203, 204, 29, 30; 220/1.5; 52/309.1; 105/401, 409

[56] References Cited

U.S. PATENT DOCUMENTS

| | | |
|---|---|---|
| 2,883,233 | 4/1959 | Beckley ........................ 296/901 X |
| 2,962,323 | 11/1960 | McBride . |
| 3,003,810 | 10/1961 | Kloote et al. . |
| 3,561,633 | 2/1971 | Morrison ......................... 220/1.5 |
| 3,854,620 | 12/1974 | Saidla ............................. 220/9 |
| 3,932,976 | 1/1976 | Steel . |
| 4,003,492 | 1/1977 | Beveridge et al. .................. 220/62 |
| 4,078,348 | 3/1978 | Rothman . |
| 4,325,488 | 4/1982 | Ketner ........................... 220/1.5 |
| 4,498,264 | 2/1985 | McCafferty et al. ............. 296/181 X |
| 4,940,279 | 7/1990 | Abott et al. .................... 296/181 |
| 4,958,472 | 9/1990 | Ehrlich . |
| 5,042,395 | 8/1991 | Wackerle et al. ................. 105/397 |
| 5,140,913 | 8/1992 | Takeichi et al. .................. 105/397 |
| 5,178,292 | 1/1993 | Korzeniowski ................... 220/1.5 |
| 5,255,806 | 10/1993 | Korzeniowski et al. ............. 220/1.5 |
| 5,286,079 | 2/1994 | Zubko et al. .................... 296/181 |
| 5,403,062 | 4/1995 | Sjostedt et al. .................. 296/181 |
| 5,403,063 | 4/1995 | Sjostedt et al. .................. 296/187 |

Primary Examiner—Dennis H. Pedder
Attorney, Agent, or Firm—Michael Best & Friedrich

[57] ABSTRACT

A vehicle body, such as an intermodal shipping container, including upper and lower rail assemblies at the longitudinal corners of the body. The lower rail assemblies interconnect the side walls of the container with the bottom wall of the container, and the lower rail assemblies each sandwich and are adhesively bonded to the walls they interconnect to form double lap shear joints that secure the walls together without the use of fasteners and that provide double adhesive seals to make the container weathertight.

22 Claims, 10 Drawing Sheets

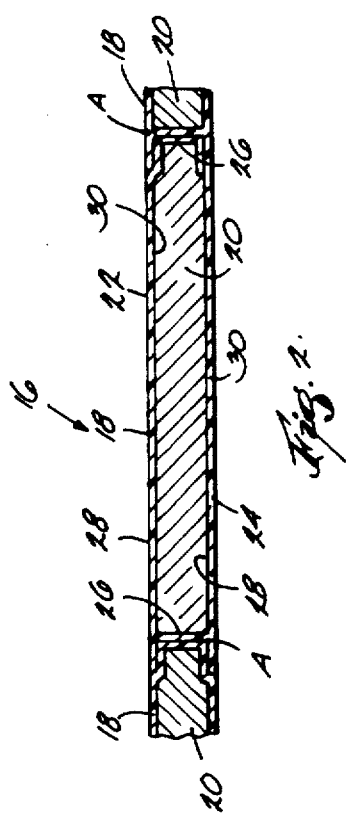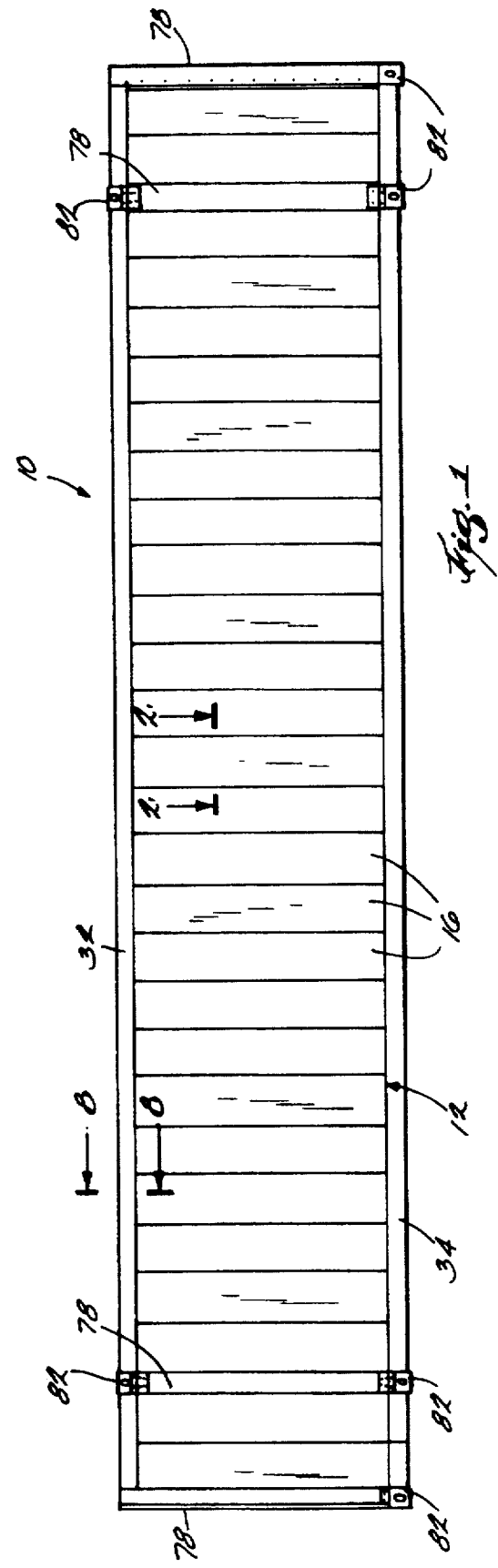

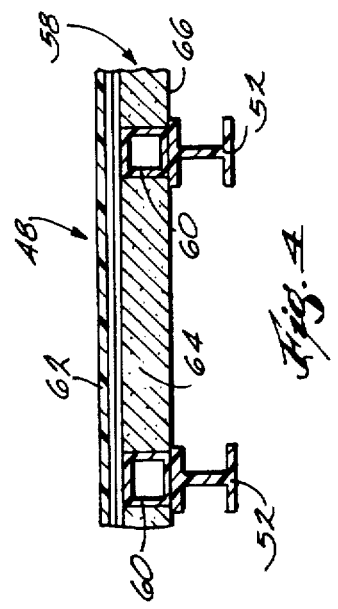
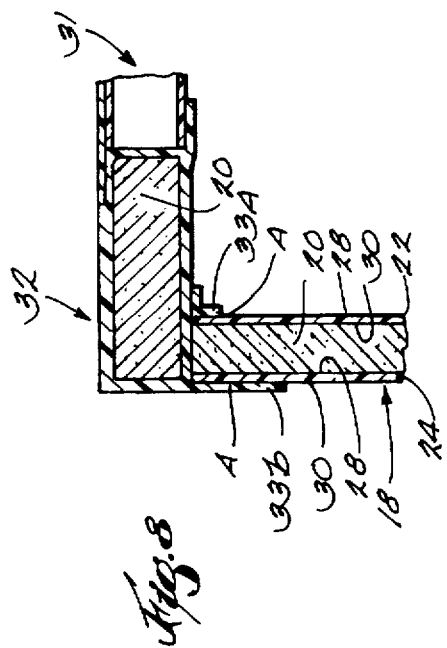
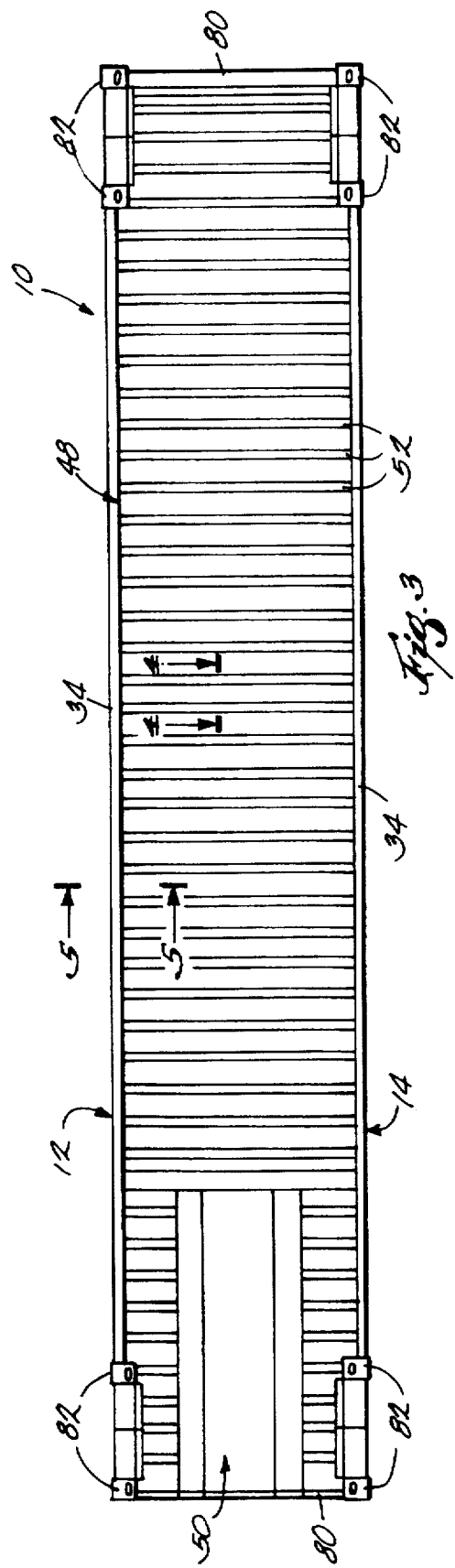

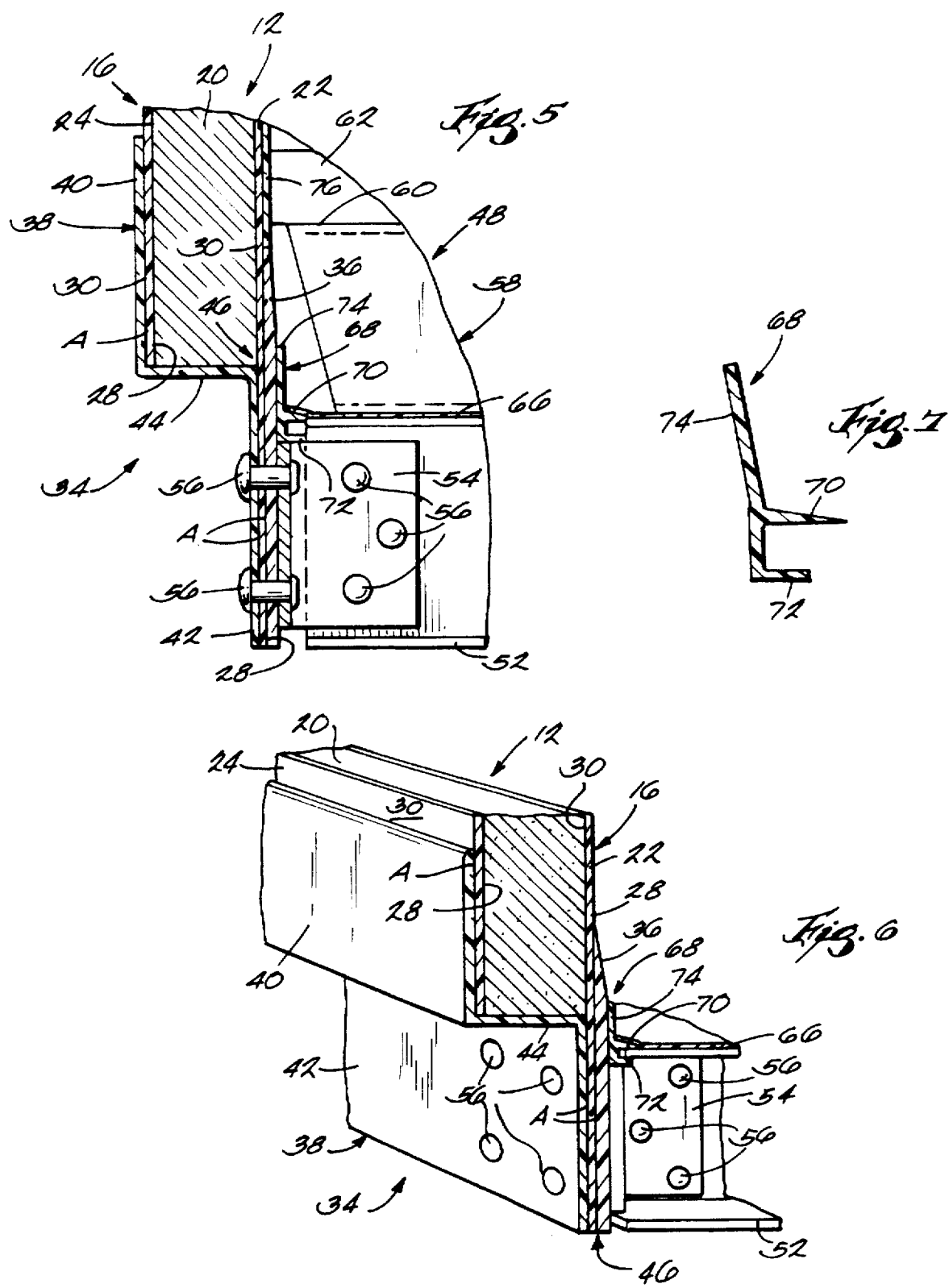

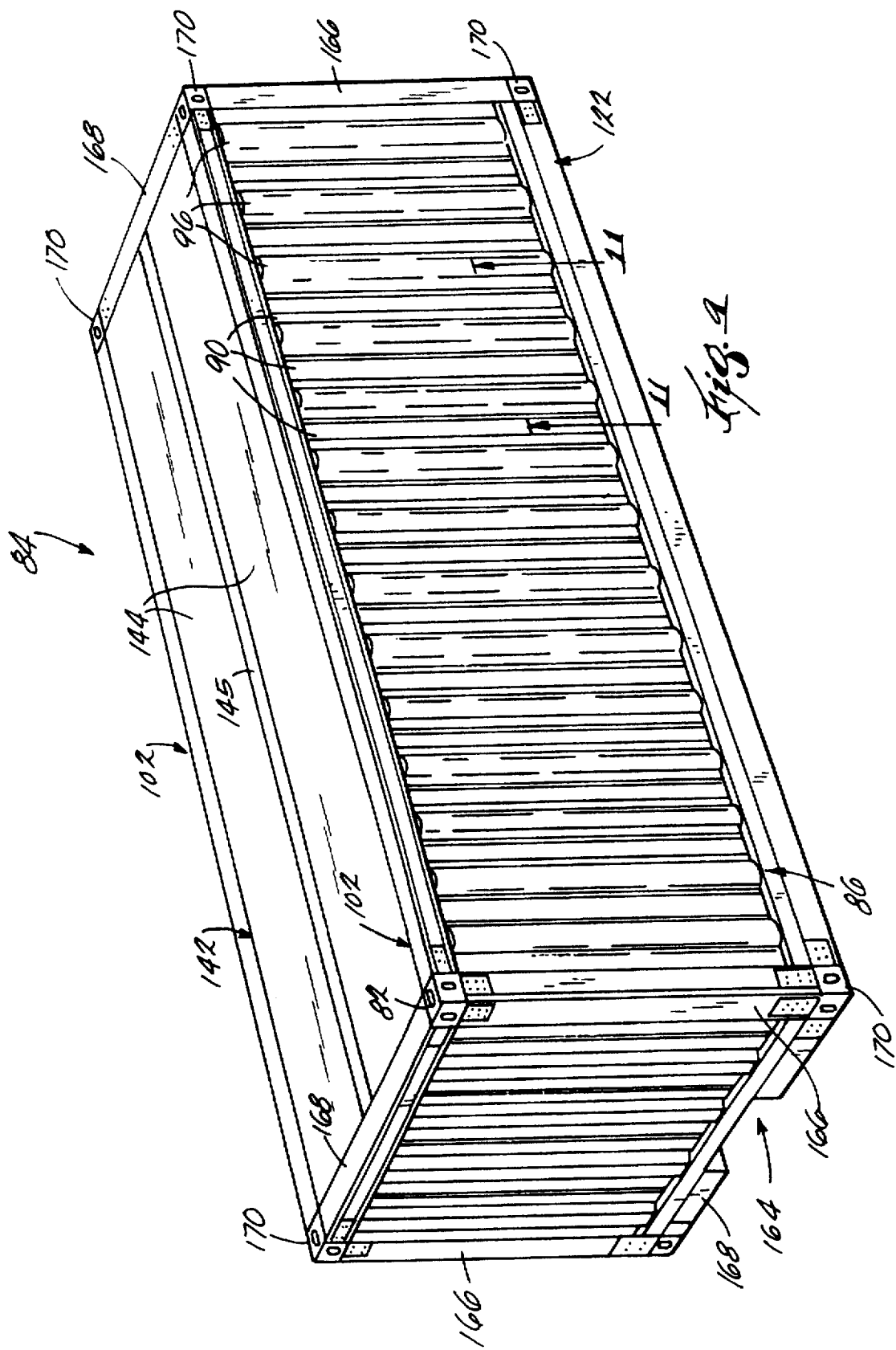

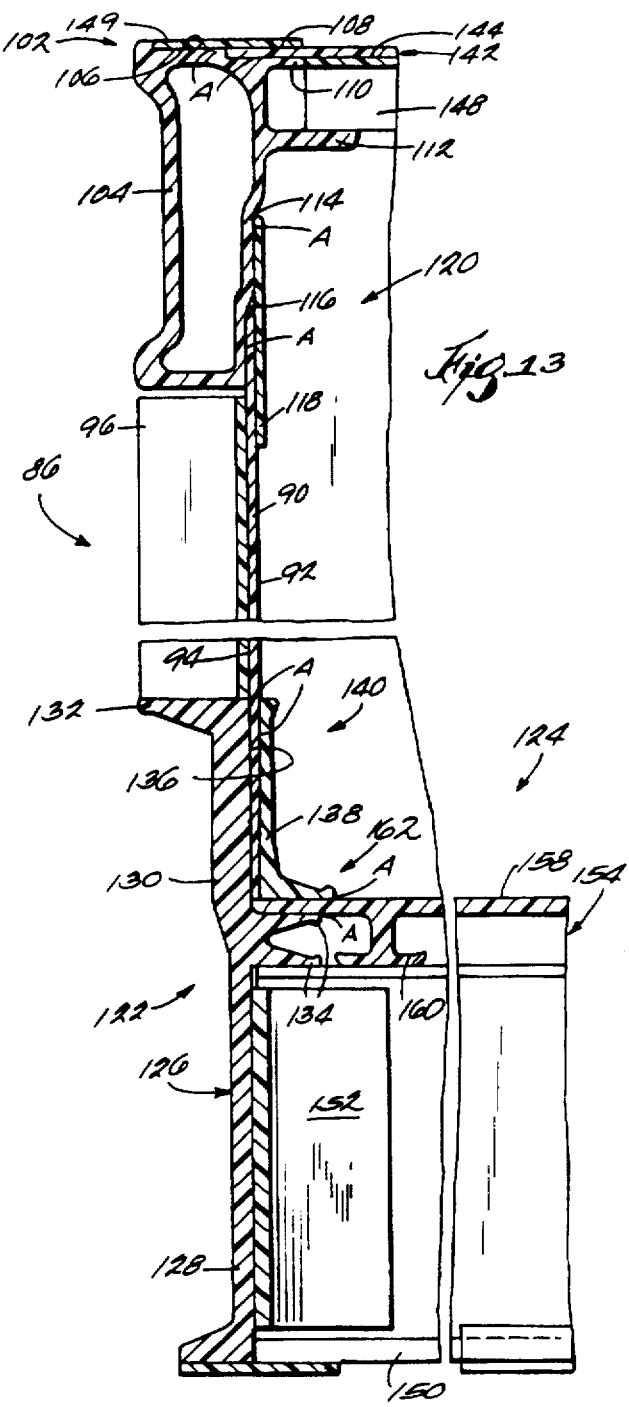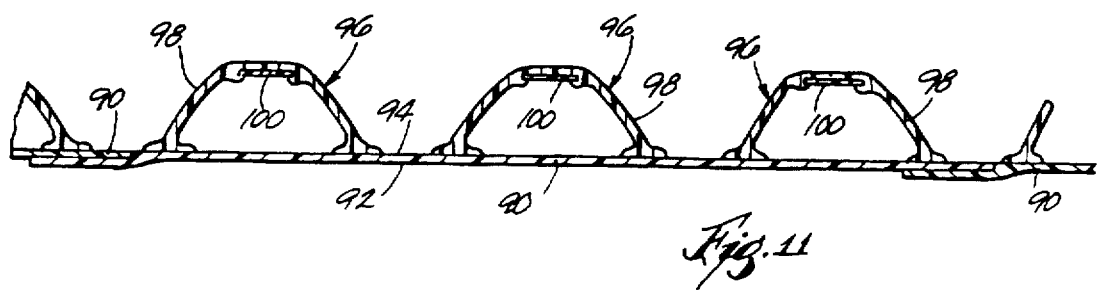

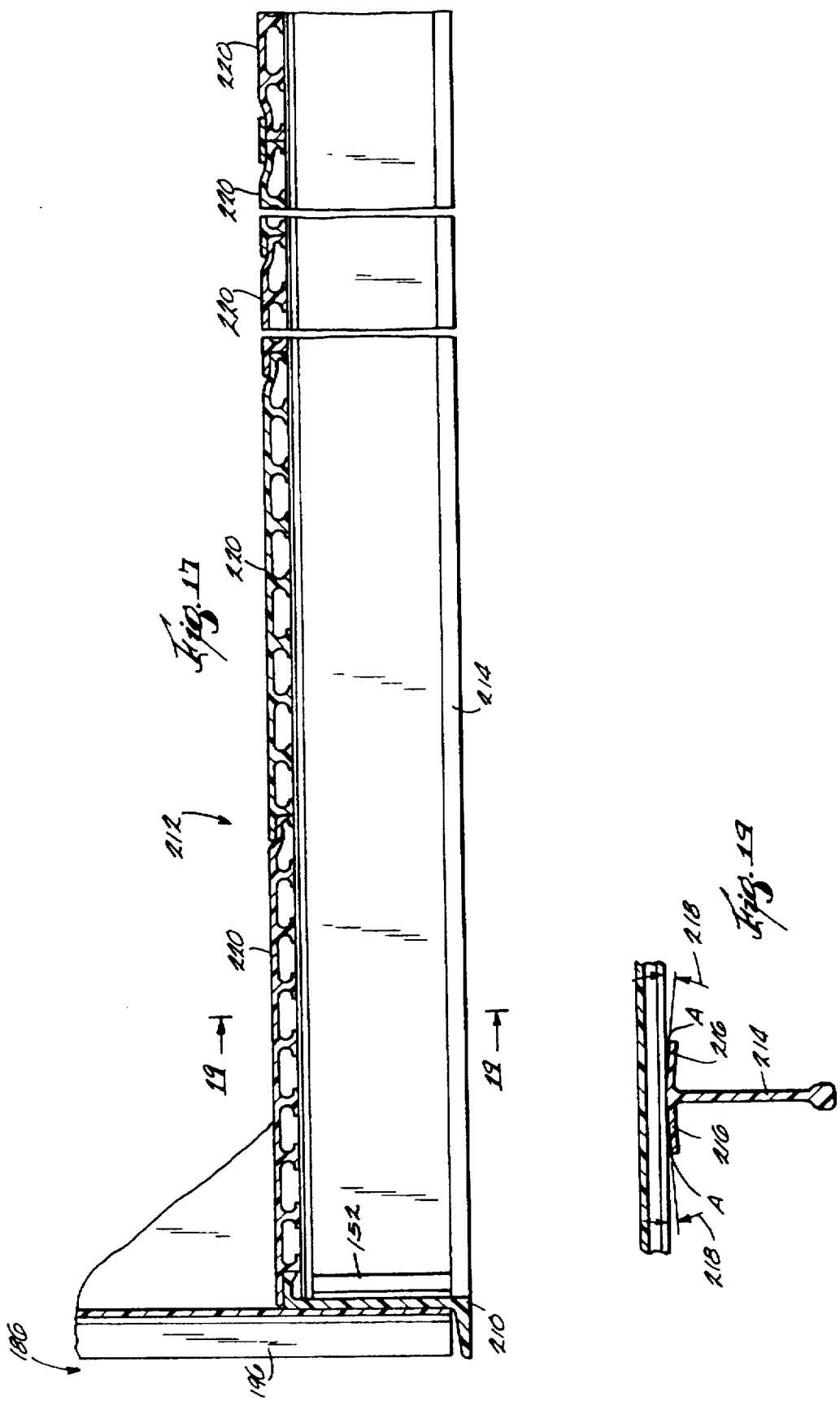

INTERMODAL CONTAINER INCLUDING DOUBLE LAP SHEAR JOINTS

BACKGROUND OF THE INVENTION

1. Field of the Invention

The invention relates generally to vehicle bodies, such as intermodal shipping containers for example, and more particularly to vehicle bodies made substantially of non-metallic materials and to joints for joining the walls of such vehicle bodies.

2. Reference to Prior Art

Intermodal shipping containers are widely used in the freight transport industry where different modes of transport (e.g., sea, rail and roadway) are used to ship the containers from one destination to another. Intermodal containers constructed using metal components are well known. One known container construction includes top, side and bottom walls joined by metal upper and lower rails that are attached to the walls with fasteners. The joints between the side walls and the bottom wall at the lower rails are subjected to particularly high loads during use of the container. Those joints also include seams and fastener holes that present potential leak sites that make the container susceptible to water (and air) leakage which can seriously damage the freight inside the container. That potential is heightened by the failure or loosening of fasteners and by possible corrosion of metal parts which can be particularly damaging in the harsh and varied environments in which intermodal containers are expected to perform. Additionally, the use of metal increases the tare of the containers to thereby reduce payload capacity.

In response to problems associated with intermodal containers (and other vehicle bodies such as trailers and truck bodies, for example) made of metallic materials, the assignee of the present invention (hereinafter "Assignee") has undertaken the development of vehicle body structures which are made substantially entirely of lightweight, corrosion resistent, fiber-reinforced plastic composite material. Examples of containers produced using such non-metallic material are provided in U.S. Pat. No. 5,178,292 issued Jan. 12, 1993 and U.S. Pat. No. 5,255,806 issued Oct. 26, 1993, both of which have been assigned to the Assignee. Those containers include composite skin members which are adhesively bonded to one another. The skin members also overlap and are adhesively bonded to container frame components.

The Assignee has also developed refrigerated or insulated intermodal containers (ISO and domestic) including walls constructed of interfitting modular panels. The panels each include spaced apart skin members, one side of each of which is adhesively bonded to the upper and/or lower rails of the container. Such a container is illustrated in U.S. patent application Ser. No. 08/065,925, filed May 21, 1993.

The Assignee's above-mentioned intermodal containers are lightweight and weathertight when compared to standard intermodal containers made substantially of metal, and Assignee's intermodal containers are structurally capable of withstanding the loads encountered during service. Additionally, the degree of weathertightness achieved by the use of adhesive material seals and joints makes those containers substantially airtight. This is especially desirable for shippers that fill containers with inert gas, to stop the ripening process of produce, for example.

SUMMARY OF THE INVENTION

The invention provides a lightweight, noncorrosive vehicle body construction having an improved arrangement for interconnecting the walls thereof to provide a structurally sound and sealed body construction. In its continuing efforts to improve its products, Assignee has replaced single lap joints between some of the frame components (i.e., the lower rails) and the walls (i.e., the side and bottom walls) with "double lap shear joints". The double lap shear joints provide improved load carrying and safety factors (especially in the highly loaded areas of the lower rails) relative to single lap joints as used in prior art containers made of non-metallic materials, and it is believed that the double lap shear joints will permit greater load-carrying capacity due to the greater inherent strength of those joints. Applicants also believe that the double lap joints increase resistance to loads tending to peel the joints apart, thereby providing even better structural characteristics that increase the durability and life of the vehicle body. Additionally, the double lap shear joints provide positive adhesive seals at the wall interfaces.

More particularly, the invention provides a vehicle body, such as an intermodal container for example, having double lap shear joints formed at selected locations between the walls and the frame component(s) of the vehicle body. The walls include panel or skin members that are sandwiched by the frame component to facilitate adhesively bonding both sides of the skin members to the frame component, thereby providing a double lap bond and double seal. In one embodiment, the side walls of the vehicle body are constructed of one or more skin members that are joined to the lower rails with double lap shear joints. The lower rails include rail sections that sandwich the skin member(s) and that are bonded to the opposite sides of the skin member(s) to form the double lap shear joints. The use of double lap shear joints may also be employed at other locations in the vehicle body, such as, for example, at the joints between the top wall and the upper rails and at the joints between composite lower crossmembers in the bottom wall and the lower rails.

In another embodiment the invention provides an insulated or refrigerated intermodal container (or other vehicle body) including side walls having interior and exterior skin members separated by an insulating space. Each side wall is connected to one of the lower rails with a double lap shear joint formed by bonding separate inner and outer lower rail sections to respective inwardly and outwardly facing surfaces of the interior skin member. The interior skin member is thus sandwiched between the rail sections. The outer rail section doglegs between the interior and exterior skin members to conveniently seal off the lower end of the side wall (i.e., the insulating space) against moisture or other foreign matter.

The intermodal container also includes floor crossmembers that form part of a bottom wall of the vehicle body and that are also connected to the lower rail to transfer loads from the floor to the side wall. Such loads are then transmitted, at least in part, to an upper rail via the interior and exterior skin members of the wall. In particular, in one embodiment the side wall is connected to the upper rail by a single lap joint between the upper rail and the exterior skin member. Loads are therefore transferred from the interior skin member to the exterior skin member before being transferred to the upper rail. The load transference between the interior and exterior skin members occurs along the height of the side wall and the loads are transferred by integral webs interconnecting those skin members and by an insulating core, if any, provided between the skin members. Thus, any damage to the exterior skin member that might result from normal use of the container (i.e., such as might occur from bumping the container with other containers or striking the container with rocks or other foreign objects) will only delay the load transition between interior and exterior skin members or redistribute the load transition. Therefore the effect of such damage on the structural integrity of the container is minimized. The inner skin member(s) (i.e., the primary load carrying member(s)) is also inherently protected from damage by virtue of its unexposed position on the interior of the container. Additionally, the outer rail section inherently increases the amount of material at the double lap shear joint and therefore provides additional protection at the lower portion of the side wall.

Various other features and advantages of the invention will become apparent to those skilled in the art upon review of the following detailed description, claims and drawings.

BRIEF DESCRIPTION OF THE DRAWINGS

FIG. 1 is a side elevational view of an intermodal container embodying various features of the invention.

FIG. 2 is an enlarged cross-sectional view taken along line 2—2 in FIG. 1.

FIG. 3 is a bottom plan view of the container illustrated in FIG. 1.

FIG. 4 is an enlarged cross-sectional view taken along line 4—4 in FIG. 3.

FIG. 5 is a partial cross-sectional view taken along line 5—5 in FIG. 3 and shows the interface between one of the side walls and the bottom wall of the container.

FIG. 6 is a perspective view of the interface area illustrated in FIG. 5 and shown with the floor section removed.

FIG. 7 is an end elevational view of the seal angle illustrated in FIGS. 5 and 6.

FIG. 8 is an enlarged cross-sectional view taken along line 8—8 in FIG. 1 and shows the interface between one of the side walls and the top wall of the container.

FIG. 9 is a perspective view of an intermodal container in accordance with a second embodiment of the invention.

FIG. 11 is an enlarged cross-sectional view taken along line 11—11 in FIG. 9.

FIG. 13 is an enlarged cross-sectional view, with sections removed, taken along line 13—13 in FIG. 10.

FIGS. 16, 17 and 18 are similar to FIGS. 11, 12 and 13, respectively, and illustrate features of another modified version of the second container embodiment shown in FIGS. 9 and 10.

FIG. 19 is a cross-sectional view taken along line 19—19 in FIG. 17.

Figure 10:
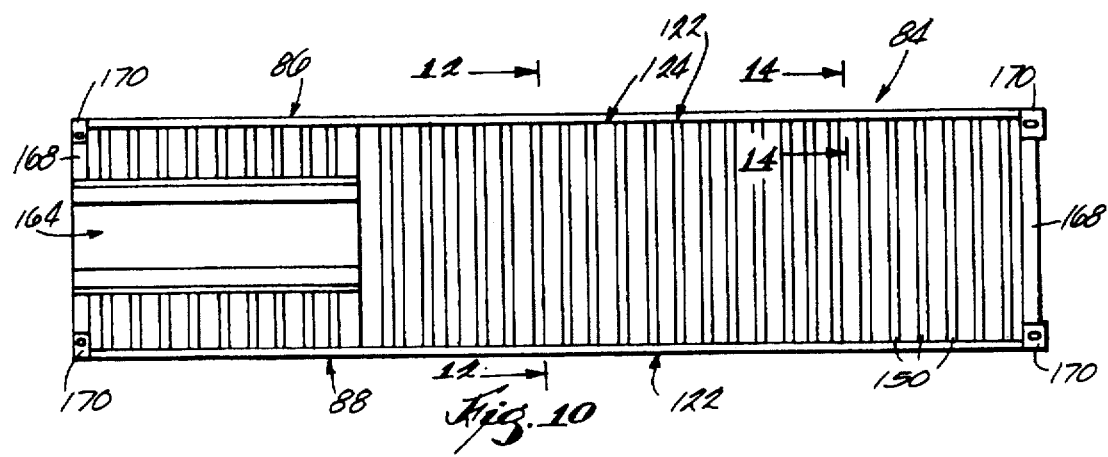
FIG. 10 is a reduced bottom plan view of the container illustrated in FIG. 9.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a freight hauling vehicle or container body 10 embodying the invention. While the container body 10 can be integrated into a variety of freight hauling vehicles, such as to serve as a rail car, a trailer or truck body or a freight shipping container, in the illustrated embodiment the container body 10 is an intermodal shipping container. More particularly, the container 10 is a refrigerated domestic intermodal container (i.e., RDC container) having a length of about 48 feet. However, as will be apparent to those skilled in the art upon review of the following, the invention is applicable to vehicle or container bodies of various sizes and lengths (including ISO and Domestic intermodal containers and variously sized trailer and truck bodies) used in various applications (including refrigerated, insulated or dry applications).

The RDC container 10 as well as other embodiments discussed below are preferably made substantially entirely of non-metallic materials. In particular, in preferred embodiments many of the components of the containers in accordance with the present invention are made with fiber-reinforced plastic material and are preferably formed via pultrusion. Pultrusion apparatus and methods known in the art are disclosed in U.S. Pat. No. 3,769,127 issued Oct. 30, 1973 to Goldsworthy et. al., and in U.S. Pat. No. 3,556,888 issued Jan. 19, 1971, and U.S. Pat. No. 2,871,911 issued Feb. 3, 1959, both to Goldsworthy, all of which are incorporated herein by reference. Briefly, the pultrusion process involves passing fibrous material through a resin bath and pulling the resulting composite through a die wherein the material is formed into the desired shape and cured.

The composite material used to produce the pultruded components includes a resin binder material, such as polyester resin which is sold by Owens-Corning as Model No. E606-6-12. Other suitable resins include, for example, various polyesters, polypropylenes, phenolics, epoxies, and polycarbonites. The composite material also preferably includes a multi-directional array of filamentary material dispersed throughout the cross-section of the pultrusion. A suitable filamentary material is known in the industry as 113E-glass roving. Possible filamentary material substitutes include, for example, glass fibers known in the industry as E-, S-, S2- and A-glass fibers, as well as carbon, graphite, boron, and aramid fibers. If desired, the different filamentary materials can be mixed in the same part to customize the structural characteristics of that part to its particular application.

The RDC container 10 includes opposite side walls 12 and 14 that are mirror images of each other. Hence, only side wall 12 is discussed in detail. As shown in FIGS. 1 and 2, side wall 12 includes interfitting modular side panels 16 that are preferably adhesively bonded to one another with a structural adhesive material A. An example of a suitable adhesive material is a methacrylate adhesive sold by ITW Adhesive Systems of Farmington Hills, Mich. under the model designation AO420.

As shown in FIG. 2, each of the side panels 16 includes a hollow panel member 18 that is preferably pultruded of fiber-reinforced plastic composite material. The interior space within the panel member 18 is open at the bottom (see FIGS. 5 and 6) and at the top (see FIG. 8) and is filled with a suitable insulation such as foam insulation 20. The panel member 18 includes laterally spaced apart interior and exterior sheet-like panels or skin members 22 and 24, respectively, interconnected by integral webs 26. The interior and exterior skin members 22 and 24 each include inwardly and outwardly facing surfaces 28 and 30, respectively. For reasons more fully explained below, the interior skin member 22 of each side panel 16 (see FIGS. 5 and 6) extends below the exterior skin member 24. Otherwise, the side panels 16 are substantially as shown and described in aforementioned patent application Ser. No. 08/066,391 which is herein incorporated by reference.

To join the side walls 12 and 14 with a top wall 31 (partially shown in FIG. 8) each of the side walls 12 and 14 is provided with an upper rail assembly 32 (only one of which is shown). While the upper rail assemblies 32 can have other configurations, in the illustrated embodiment the upper rail assemblies 32 (and the top wall) are as described in aforementioned patent application Ser. No. 08/066,391. As shown in FIG. 8, each upper rail assembly 32 includes a hollow upper rail 33 filled with the insulation 20 and a pultruded angle member 33a bonded with adhesive material A to the upper rail 33 and the interior wall skin 22. The upper rail 33 includes a flange 33b that is bonded with adhesive material A to the exterior wall skin 24. Thus, angle member 33a and the flange 33b sandwich one of the side panels 16.

The side walls 12 and 14 are also provided with (FIG. 3) lower rail assemblies 34 for joining the side walls and a bottom wall, as is further explained below. The components of the lower rail assemblies 34 are preferably also pultrusions made of fiber-reinforced plastic composite material, and each lower rail assembly 34 is assembled on one of the side walls 12 and 14 as an integral part thereof, preferably without the use of fasteners. In particular, as shown in FIGS. 5 and 6, each lower rail assembly 34 includes a plate-like first or inner rail section 36 bonded with adhesive material A to the inwardly facing surfaces 28 of the interior skin members 22. Each lower rail assembly 34 also includes a second or outer rail section 38 that is generally doglegged (or S-shaped) and that fits over the exposed lower end portions of the side panels 16 to seal the bottoms of the side walls 12 and 14. The outer rail section 38 includes an outer leg 40 bonded with adhesive material A to the outwardly facing surfaces 30 of the exterior skin members 22 and an inner leg 42 bonded with adhesive material A to the outwardly facing surfaces 30 of the interior skin members 22. A third or middle portion 44 extends between the outer and inner legs 40 and 42 to close the bottoms of the side panels 16. The joint thus formed between each lower rail assembly 34 and the corresponding one of the side walls 12 and 14 includes a double lap shear joint 46 in which the interior skin members 22 of the side wall are sandwiched between and fixed via adhesive bonds to the inner and outer rail sections 36 and 38.

The RDC container 10 also includes a bottom wall 48 which in the illustrated embodiment is provided with (FIG. 3) a tunnel section 50 at its front end to accommodate a chassis (not shown) to permit the RDC container 10 to be transported over the road in a manner known in the art. The bottom wall 48 also includes (FIGS. 3 and 4) laterally extending I-shaped crossmembers 52 spaced at regular intervals along the length of the RDC container 10. The crossmembers 52 can be made of metal or can also be pultruded of composite material.

Means are provided for attaching the crossmembers 52 to the lower rail assemblies 34 to interconnect the side walls 12 and 14 and the bottom wall 48. In the illustrated arrangement, the means for attaching includes (FIGS. 5 and 6) T-shaped clips 54 (only one is shown) attached to the opposite ends of the crossmembers 52 via suitable mechanical means such as adhesive material and/or fasteners 56. The T-shaped clips 54 or angles are also fixed to the lower rail assemblies 34 via adhesive material and/or additional fasteners 56 extending through the double lap shear joints 46.

In the embodiment illustrated in FIGS. 1–6, loads exerted on the bottom wall 48 are transmitted to the side walls 12 and 14 through the double lap shear joints 46 such that the primary loads are transferred substantially entirely to the interior skin members 22. The primary loads, at least in part, are then transferred to the exterior skin members 24 by the webs 26 of the panel members 18 (and also to a lesser degree by the core of insulation 20). That load transference takes place over the height of the panel members 18 and therefore localized damage to the exterior skin members 24 (or the interior skin members 22) will result in delay or redistribution of the load transition between interior and exterior skin members 22 and 24. Therefore, such damage has minimal effect on the structural integrity of the RDC container 10. Additionally, since the inner skin members 22 are on the inside of the container 10 they are inherently protected from damage.

The bottom wall 48 also includes a floor section 58 that is supported on the crossmembers 52. The floor section 58 includes (FIG. 4) spacer tubes or stringers 60 which are preferably pultruded of fiber-reinforced plastic composite material and which are positioned on top of the crossmembers 52. The floor section 58 also includes a suitable floor 62, such as the inverted composite T-duct floor, for example, which is explained hereinafter, supported on top of the stringers 60. Foam insulation 64 is provided in the spaces between the stringers 60, and a subpan 66 is provided between the floor section 58 and the crossmembers 52 to protect the insulation 64. The subpan 66 is preferably made of a non-metallic material. An example of a suitable material is sold under the name KEMLITE.

To seal the joints between the bottom wall 48, and particularly the floor section 58, and the side walls 12 and 14, each of the lower rail assemblies 34 is provided with means for interfacing with the floor section 58. In the illustrated arrangement each of the interfacing means includes a flexible sealing member 68 that is movable between flexed and unflexed positions and that is preferably made of thermoplastic polymer material. As shown in FIG. 7, the sealing member 68 includes a wedge-shaped upper flange 70 and a lower flange 72 that (FIGS. 5 and 6) fit over the crossmembers 52 in the area above the clips 54. The subpan 66 overlaps and is adhesively bonded to the upper flange 70. The sealing member 68 also includes an upper portion 74 which (FIG. 7) is angled when in the unflexed state.

When the bottom wall 48 and the side walls 12 and 14 are drawn together during assembly, the upper portion 74 of each sealing member 68 is flexed toward a vertical position (see FIGS. 5 and 6). The ultimate orientation of the upper portion 74 depends on the fit-up tolerance between the corresponding one of the side walls 12 and 14 and the bottom wall 48. Adhesive material is preferably applied to the upper portion 74 of each sealing member 68 prior to fit-up to bond the sealing members 68 to the lower rail assemblies 34. The resulting joints between the side walls 12 and 14 and the floor section 58 are substantially leakproof. If desired, a scuff plate 76 can be bonded to the lower part of each side wall 12 and 14.

The RDC container 10 also includes a frame structure which incorporates the upper and lower rail assemblies 32 and 34, as well as the crossmembers 52 and the tunnel section 50. The frame structure also includes (FIG. 1) vertically extending posts 78 and (FIG. 3) horizontally extending beams 80 interconnecting the upper and lower rail assemblies 32 and 34. To facilitate attachment of the RDC container 10 to other containers or to a support surface, such as the deck of a ship, a railroad well car or a trailer chassis, standard metallic lock-receiving fittings 82 are provided at standard locations on the frame structure.

Illustrated in FIGS. 9 and 10 is a container 84 in accordance with a second embodiment of the invention. While the container 84, like the RDC container 10, can be a domestic container, an ISO container, or a container of any other desirable size, in the illustrated arrangement the container 84 is a 40' long ISO dry van container.

The ISO container 84 includes (FIGS. 10 and 12) opposite side walls 86 and 88 that are preferably mirror images of each other. The side walls 86 and 88 are constructed of overlapping side skin members 90 (see FIG. 11) that are adhesively bonded to one another and that are preferably thicker than the skin members 22 and 24 of container 10. Each of the side skin members 90 also includes inwardly and outwardly facing surfaces that respectively form portions of inwardly and outwardly facing surfaces 92 and 94 of the side walls 86 and 88. In a preferred embodiment, the side skin members 90 are pultruded of fiber-reinforced plastic composite material, however, in other embodiments other materials could be used.

Each of the side walls 86 and 88 also includes reinforcing ribs 96 adhesively bonded to the side skin members 90 to reinforce those members. Each of the ribs 96 includes a rib section 98, which in the illustrated arrangement is made of a thermoplastic polymer material, and a pultruded composite insert 100.

Each of the side walls 86 and 88 is preferably assembled as a subassembly including part of an upper rail assembly 102 which acts as a means for joining the corresponding one of the side walls 86 and 88 to a top wall, as is further explained below. As shown in FIG. 13, each upper rail assembly 102 includes a tubular upper rail section 104 having successive upper step portions 106 and 108 and a pair of inwardly extending and downwardly offset flanges 110 and 112. The upper rail section 104 also includes an inner surface having successive step portions 114 and 116. Step portion 116 is overlapped by side skin members 90 which are bonded thereto with adhesive material A. Each upper rail assembly 102 also includes a second rail section or lap plate 118 bonded with adhesive material A to the inwardly facing surface 92 of the corresponding side wall and to the step portion 114. The side skin members 90 are thus sandwiched by the upper rail assembly 102 to provide a double lap shear joint 120 between the upper rail assembly 102 and the corresponding one of the side walls 86 and 88. The components of each upper rail assembly 102 (i.e., the upper rail section 104 and the lap plate 118) are preferably pultruded of fiber-reinforced plastic composite material.

The subassembly of each of the side walls 86 and 88 also preferably includes part of a lower rail assembly 122, the lower rail assemblies 122 acting as a means for joining the side walls 86 and 88 to a bottom wall 124, as is further explained below. As shown in FIG. 13, each lower rail assembly 122 includes a main lower rail section 126 having a plate-like lower portion 128 and an upper portion 130. The upper portion 130 includes an outwardly projecting leg 132, a pair of opposed inwardly projecting flanges 134, and a recessed inwardly facing surface portion 136 bonded with adhesive material A to the outwardly facing surface 94 of the corresponding one of the side walls 86 and 88. Each lower rail assembly 122 also includes an inner angled section 138 that is adhesively bonded over the inwardly facing surface 92 and to the upper portion 130. The side skin members 90 are thus sandwiched by the lower rail assembly 122 to provide a double lap shear joint 140 between the lower rail assembly 122 and the corresponding one of the side walls 86 and 88. The components of each lower rail assembly 122 (i.e., the lower rail section 126 and the angled section 138) are also preferably pultruded of fiber-reinforced plastic composite material.

The ISO container 84 also includes a top wall 142. In the illustrated arrangement, the top wall 142 includes (FIG. 9) longitudinally extending sheet-like top skin members 144 that can be pultruded of fiber-reinforced plastic composite material. In one embodiment, the top skin members 144 overlap and are adhesively bonded to one another, however, in the illustrated arrangement the top skin members 144 are adhesively bonded to one another using a pultruded splice plate 145 as well as adhesive material. The top skin members 144 extend between the upper rail assemblies 102 and each overlaps and is bonded with adhesive material A to the step portion 108 (see FIG. 13) of one of the upper rail assemblies 102. To provide a double lap shear joint 120 between each of the upper rail assemblies 102 and the top wall 142, each of the upper rail assemblies 102 includes a rail section in the form of a lap plate 149 that is preferably pultruded of fiber-reinforced plastic composite material. As shown in FIG. 13 the lap plate 149 is bonded to the step portion 106 and to one of the top skin members 144. The top wall 142 also includes laterally spaced apart roof bows 148 (one is partially shown in FIG. 13) supporting the top skin members 144. The roof bows 148 are supported on and adhesively bonded to the flange 112 of each upper rail assembly 102.

The ISO container 84 also includes the aforementioned bottom wall 124. As shown in FIG. 10, the bottom wall 124 includes laterally extending I-shaped crossmembers 150 and means for attaching the crossmembers 150 to the lower rail assemblies 122. In the illustrated arrangement the attaching means includes L-shaped clips 152 each adhesively bonded between one of the crossmembers 150 and the inside of the lower portion 128 of one of the lower rail assemblies 122. Each crossmember 150 is preferably provided with a pair of clips 152 on each of its opposite ends to form a double lap shear joint with each lower rail assembly 122. The crossmembers 150 are also preferably adhesively bonded to the lowermost flanges 134. Both the crossmembers 150 and the clips 152 are preferably pultruded of fiber-reinforced plastic composite material.

The bottom wall 124 also includes a floor section 154 supported on the crossmembers 150. The floor section 154 includes (FIG. 12) floor panels 156 which are preferably integrally pultruded of fiber-reinforced plastic composite material. Each floor panel 156 has a generally planar support skin or plate 158 that overlaps and is adhesively bonded to the support plate 158 of an adjoining floor panel. Each of the floor panels 156 also includes downwardly extending reinforcing members 160 each having an inverted "T" shape. The reinforcing members 160 can, if desired, be adhesively bonded to the tops of the crossmembers 150.

To seal the interface between the bottom wall 124 and the side walls 86 and 88, the support plates 158 of the outermost floor panels 156 (see FIG. 13) overlap and are bonded with adhesive material A to the uppermost flanges 134. The angled rail sections 138 are also bonded with adhesive material A to the upper surfaces of the support plates 158 to sandwich the support plates 158 and to provide a double lap shear joint 162 between each of the lower rail assemblies 122 and the bottom wall 124.

The ISO container 84 also includes a frame structure which incorporates the upper and lower rail assemblies 102 and 122, the crossmembers 150 and (FIG. 10) a tunnel section 164. That frame structure also includes vertical posts 166 and horizontal beams 168 that are provided at their intersections with standard lock-receiving fittings 170 for attaching the ISO container 84 to a support surface or another container.

Figure 15:
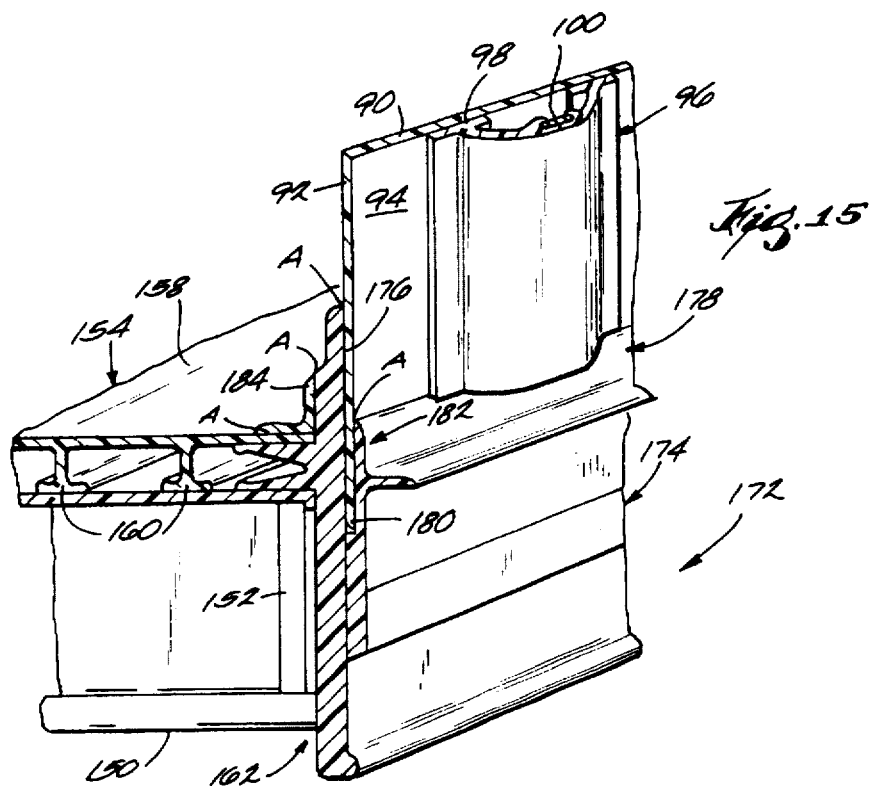
FIG. 15 is an outside perspective view of the interface between the side wall and bottom wall illustrated in FIG. 14.
Figure 14:
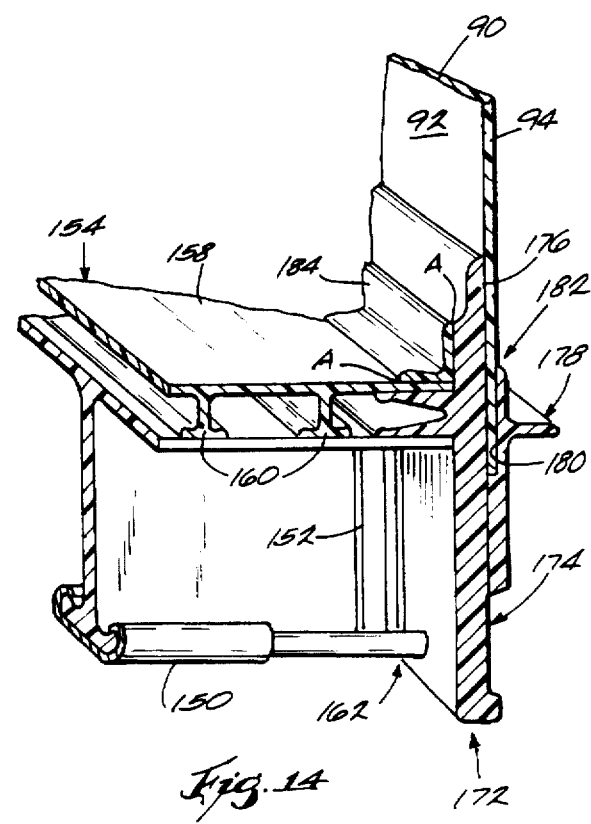
FIG. 14 is similar to the lower portion of FIG. 13 and provides an inside perspective view of a modified interface between the side wall and the bottom wall.

Illustrated in FIGS. 14 and 15 is the bottom wall/side wall interface area of a container including an alternative lower rail construction. In particular, that interface area includes a lower rail assembly 172 including a main rail section 174. The main rail section 174 includes the above-mentioned flanges 134 and an outwardly facing surface 176 to which the inwardly facing surface 92 of a side wall is adhesively bonded. The lower rail assembly 174 also includes an outer rail section 178 having a recessed surface portion 180 adhesively bonded to the outwardly facing surface 94 of the side wall. The outer rail section 178 is also adhesively bonded at its lower end to the main rail section 174. Thus the side wall skin 90 is sandwiched between and adhesively bonded to the main and outer rail sections 174 and 178 to form a double lap shear joint 182. The lower rail assembly 174 also includes an angled inner rail section 184 that is similar to inner rail section 138, except that inner rail section 184 is not bonded to the side skin members 90.

Figure 16:
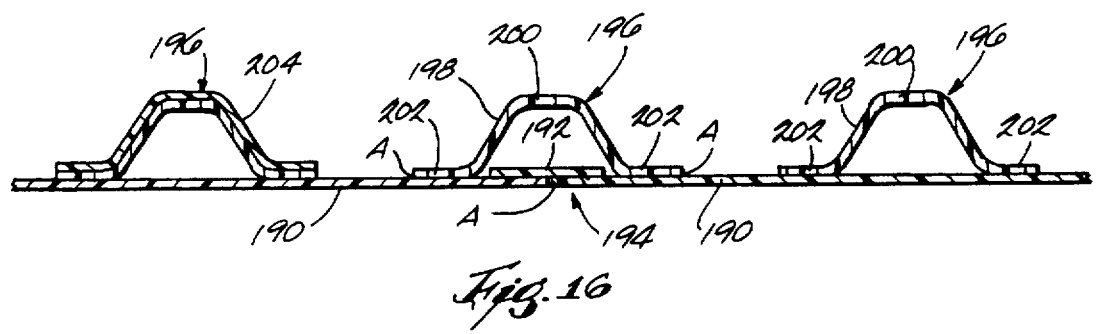
Figure 12:
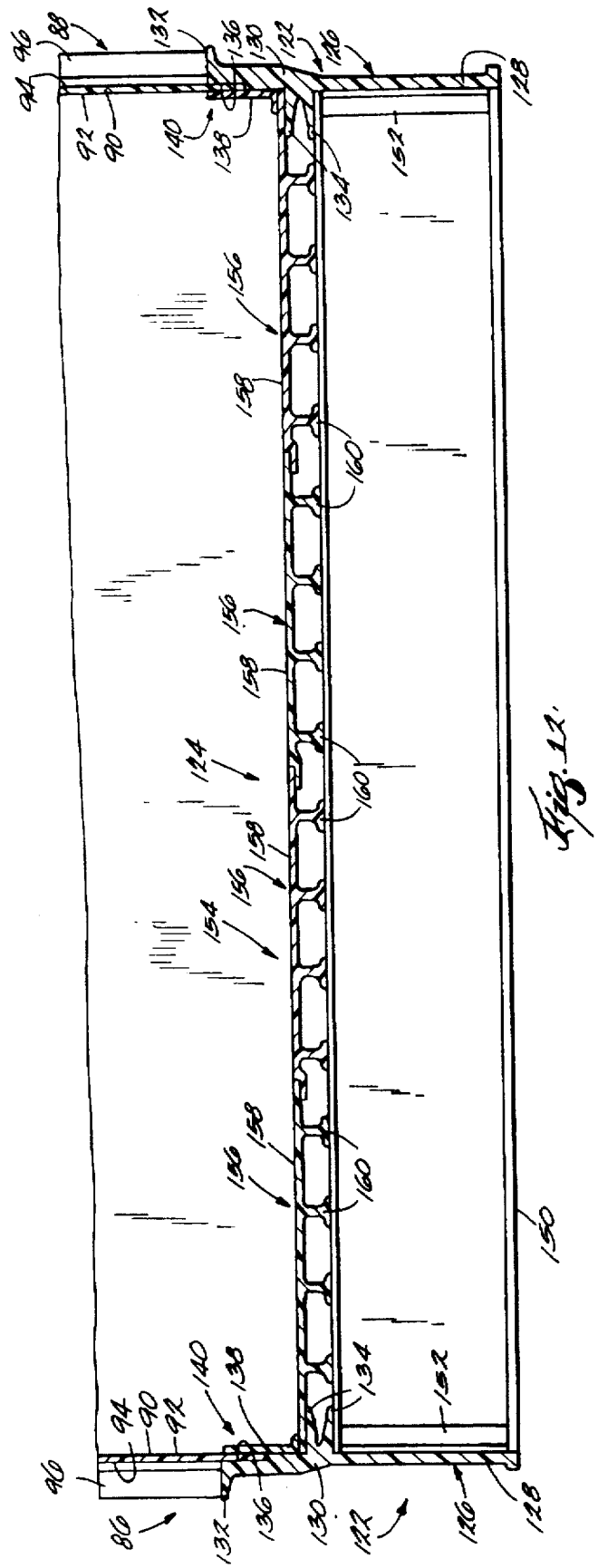
FIG. 12 is an enlarged cross-sectional view taken along line 12—12 in FIG. 10.

Illustrated in FIGS. 16–19 are sectional views showing modifications to the container structure illustrated in FIGS. 11–13. In particular, those modifications include a modified side wall 186 including (FIG. 16) closely adjacent or abutting pultruded side skin members 190 arranged in coplanar relation. To join the side skin members 190, the side wall 186 is provided with splice members 192 (only one is shown) that extend the length of the side skin members 190. As shown in FIG. 16, each splice member 192 is adhesively bonded over adjoining side skin members 190 to form a splice joint 194. In a preferred embodiment, the side skin members 190 and the splice members 192 are all pultruded of fiber-reinforced plastic composite material, however, in other embodiments other materials could be used.

The modified side wall 186 also includes side posts or stiffeners 196 adhesively bonded to the side skin members 190 to reinforce those members. Each of the stiffeners 196 is provided with a hat portion 198 having a thickened crown 200 for added reinforcement and flanges 202, and each of the stiffeners 96 is also pultruded of fiber-reinforced plastic composite material. As shown in FIG. 16, intermittent ones of the stiffeners 196 are placed over each splice joint 194 to protect that joint. In the event of damage to one of the stiffeners 96, that stiffener can be easily repaired by adhesively bonding a patch member 204 thereover. As also shown in FIG. 16, the patch member 204 has an inside configuration that matches the outside configuration of the stiffeners 196.

Figure 18:
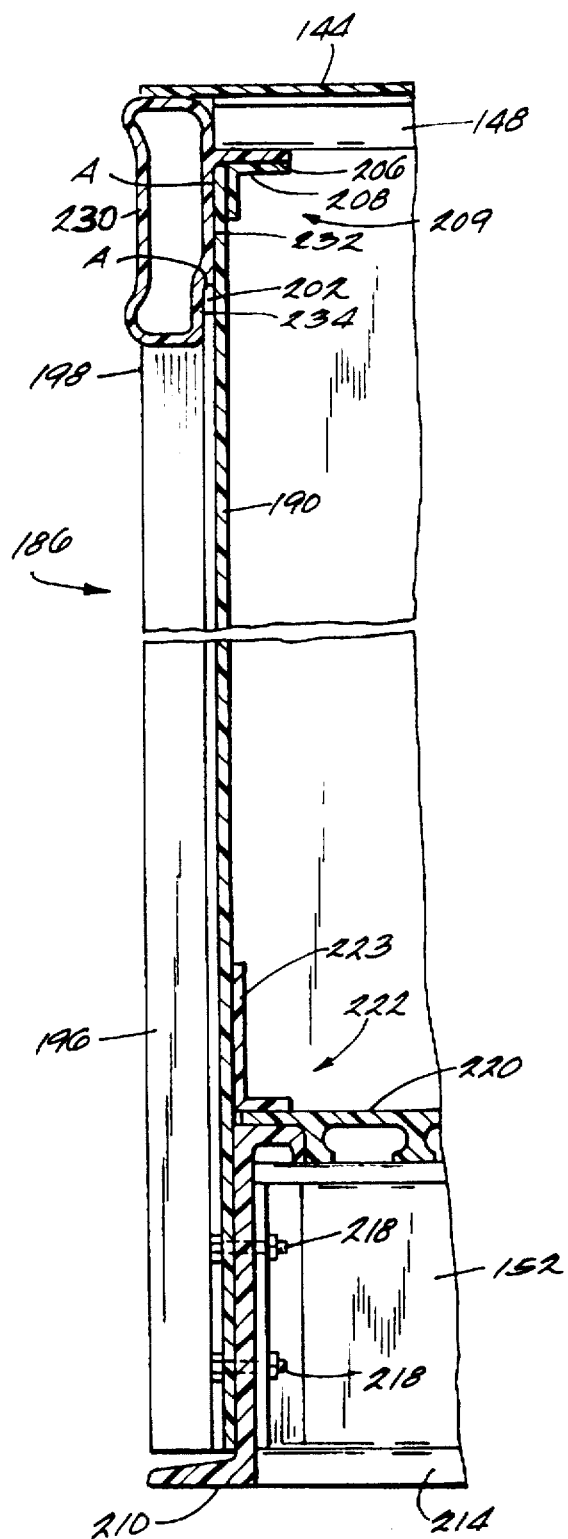

The modified side wall 186 also includes an upper rail 230 which is preferably pultruded of composite material. As shown in FIG. 18, the upper rail 230 includes an inwardly extending flange 206 that supports the roof bows 148. The upper rail 230 also includes an inner surface 232 having a recessed surface portion 234. The inner surface 232 is overlapped by the side skin members 190 which are bonded thereto with adhesive material A, and the hat portion 198 at the top of each stiffener 196 is removed to permit the flanges 202 to extend up over the recessed surface portion 234. If desired, a pultruded angle member 208 is adhesively bonded to the inwardly extending flange 206 and the side skin members 190 to provide a double lap seal joint 209.

The modified side wall 186 also includes a lower rail 210 which in the illustrated embodiment is pultruded of composite material and includes a Z-shaped cross-section. The lower end portions of the side skin members 192 are adhesively bonded to the lower rail 210.

The modified container structure of FIGS. 16–19 also includes a modified bottom wall 212. Bottom wall 212 includes generally T-shaped crossmembers 214 (see FIG. 19) having flanges 216 that each extend downwardly at a slight angle indicated by reference numeral 218. The crossmembers 214 are attached to the lower rails 210 using clips 152 and adhesive material and/or fasteners 218 as described above.

The bottom wall 212 also includes (FIG. 17) modified floor panels 220 which are preferably pultruded of fiber-reinforced plastic composite material. As shown in FIG. 18, the outermost floor panels 220 overlap a corresponding lower rail 210 and are adhesively bonded thereto. An optional pultruded angle member 223 can be bonded to the interface area of the floor panels 220 and the side skin members 190, if desired to provide a double lap seal 222 at that joint. The floor panels 220 are also preferably adhesively bonded to the tops of the crossmembers 214 (see FIG. 19), and the angled flanges 216 provide additional space for adhesive material A.

Advantageously, the upper and lower rail assemblies of the containers described herein provide double lap shear joints (i.e., double lap shear joints 46, 120, 140, 162, 182, 209 and 222) at the intersections of the container walls. The double lap shear joints are structurally very sound and also provide double adhesive seals against leakage.

Various features and advantages of the invention are set forth in the following claims.

We claim:

1. A vehicle body comprising
a plurality of interconnected walls forming a box-like structure, one of said walls including a lower extent and a skin member having opposite sides and a portion extending past said lower extent of said one wall, and
a first rail assembly interconnecting said one wall and another of said walls, said first rail assembly including first and second rail sections sandwiching said skin member of said one wall, said first rail section being adhesively bonded to one of said sides of said skin member, and said second rail section being adhesively bonded to the other of said sides of said skin member.

2. A vehicle body as set forth in claim 1 wherein said skin member of said one wall is made of a fiber-reinforced plastic composite material, and wherein said skin member of said one wall includes an inwardly facing surface and an outwardly facing surface.

3. A vehicle body as set forth in claim 1 wherein said first rail assembly is a first lower rail assembly, wherein said other wall is a bottom wall, and said one wall is a first side wall, wherein said plurality of walls includes a second side wall opposite said first side wall, said second side wall including a lower extent and a skin member having opposite inwardly and outwardly facing surfaces and having a portion extending past said lower extent of said second side wall, wherein said vehicle body includes a second lower rail assembly interconnecting said second side wall and said bottom wall, said second lower rail assembly including first and second rail sections sandwiching said skin member of said second side wall, said first and second rail sections of said second lower rail assembly being adhesively bonded to said inwardly and outwardly facing surfaces of said skin member of said second side wall, and wherein said skin member of each of said first and second side walls is made of a non-metallic material.

4. A vehicle body as set forth in claim 3 wherein said plurality of walls includes a top wall, and means for joining said first and second side walls to said top wall, said means for joining said first and second side walls to said top wall including first and second upper rail assemblies, each of said upper rail assemblies sandwiching said skin member of one of said first and second side walls and being adhesively bonded to the opposite sides thereof.

5. A vehicle body as set forth in claim 4 wherein said top wall includes a top skin member having upwardly and downwardly facing surfaces, said top skin member being made of a non-metallic material, wherein at least one of said first and second upper rail assemblies sandwiches said top skin member, and wherein at least one of said first and second upper rail assemblies is adhesively bonded to one of the upwardly and downwardly facing surfaces of said top skin member.

6. A vehicle body as set forth in claim 1 wherein said one wall is a side wall and said other wall is a bottom wall, and wherein said side wall includes a lower end portion, and wherein said side wall includes another skin member, said skin members of said side wall being spaced apart, and wherein one of said first and second rail sections of said first rail assembly is adhesively bonded to each of said skin members of said side wall to seal said lower end portion thereof.

7. A vehicle body comprising
    a plurality of interconnected walls forming a box-like structure, one of said walls is a side wall including an interior skin member, an exterior skin member and a lower end portion, said skin members being spaced apart and each skin member having opposite sides, and said interior skin member extending lower than said exterior skin member, and another of said walls is a bottom wall, and
    a first rail assembly interconnecting said side wall and said bottom wall, said first rail assembly including first and second rail sections sandwiching said interior skin member of said side wall, said first rail section being adhesively bonded to one of said sides of said interior skin member and one of said sides of said exterior skin member, and said second rail section being adhesively bonded to the other of said sides of said interior skin member.

8. A vehicle body as set forth in claim 1 wherein said first and second rail sections of said first rail assembly are made of a fiber-reinforced plastic composite material, and wherein said skin member of said one wall is made of a fiber-reinforced plastic composite material.

9. A vehicle body as set forth in claim 1 wherein said one wall is a side wall and said other wall is a bottom wall, said bottom wall including a floor section, said side and bottom walls forming therebetween a joint, and wherein said first rail assembly includes means for interfacing with said floor section to seal said joint.

10. A vehicle body as set forth in claim 9 wherein said means for interfacing with said floor section includes a double lap joint, said double lap joint joining said side wall to said floor section, and said double lap joint sandwiching a portion of said floor section and being adhesively bonded thereto.

11. A vehicle body as set forth in claim 9 wherein said means for interfacing with said floor section includes a flexible seal member positioned between said bottom wall and said side wall, said flexible seal member being movable from an unflexed position to a flexed position when said bottom and side walls are joined to accommodate an inexact fit-up of said side wall and said bottom wall.

12. A lightweight, leakproof intermodal container comprising
    opposite side walls, each of said side walls including a lower extent and a side skin member having inwardly and outwardly facing surfaces and a portion extending past said lower extent of said side walls,
    a bottom wall, and
    a pair of lower rail assemblies for attaching said side walls to said bottom wall, each of said lower rail assemblies including first and second rail sections, said first and second rail sections of each of said lower rail assemblies sandwiching said side skin member of one of said side walls, and said first and second rail sections of each of said lower rail assemblies being adhesively bonded to said inwardly facing surface and said outwardly facing surface, respectively, of said side skin member of one of said side walls.

13. An intermodal container as set forth in claim 12 wherein said first and second rail sections of each of said lower rail assemblies is made of a fiber-reinforced plastic composite material, and wherein each of said side skin members of each of said side walls is made of a fiber-reinforced plastic composite material.

14. An intermodal container as set forth in claim 12 wherein said bottom wall includes a floor section, and wherein each of said lower rail assemblies sandwiches a portion of said floor section and is adhesively bonded thereto.

15. An intermodal container as set forth in claim 12 wherein said bottom wall includes crossmembers made of a non-metallic material, and wherein said intermodal container includes fastenerless means for joining said crossmembers to said lower rail assemblies.

16. An intermodal container as set forth in claim 12 wherein said bottom wall includes crossmembers made of a non-metallic material, and a plurality of clips for attaching said crossmembers to said lower rail assemblies, each of said clips being made of a non-metallic material, and each of said clips being adhesively bonded between one of said crossmembers and one of said lower rail assemblies.

17. An intermodal container as set forth in claim 12, said intermodal container including a top wall, said top wall including a top skin member made of a non-metallic material, said top skin member having upwardly and downwardly facing surfaces, and a pair of upper rail assemblies for attaching said side walls to said top wall, each of said upper rail assemblies including first and second rail sections each made of a fiber-reinforced plastic composite material, said first and second rail sections of each of said upper rail assemblies sandwiching said top skin member, and said first and second rail sections of each of said upper rail assemblies and being adhesively bonded to said upwardly and downwardly facing surfaces, respectively.

18. A lightweight, leakproof intermodal container comprising
    a pair of opposite side walls, each of said side walls including spaced apart interior and exterior skin members,
    a bottom wall, and
    a pair of lower rail assemblies, each of said lower rail assemblies including a first rail section adhesively bonded to each of said interior and exterior skin members of one of said side walls, and a second rail section adhesively bonded to said interior skin member of said one side wall.

19. An intermodal container as set forth in claim 18 wherein each of said interior and exterior skin members of each of said side walls includes opposite inwardly and outwardly facing surfaces, and wherein said first rail section of each of said lower rail assemblies is adhesively bonded to each of said outwardly facing surface of said exterior skin member of one of said side walls and said outwardly facing surface of said interior skin member of said one side wall, and wherein said second rail section of each of said lower rail assemblies is adhesively bonded to said inwardly facing surface of said interior skin member of one of said side walls.

20. An intermodal container as set forth in claim 19 wherein said interior and exterior skin members of each of said side walls define therebetween a space having a lower end, and wherein each of said first rail sections doglegs between said interior and exterior skin members of one of said side walls to close said lower end of said space therebetween.

21. An intermodal container as set forth in claim 19 wherein said interior skin member of each of said side walls extends lower than said exterior skin member thereof.

22. A vehicle body as set forth in claim 1 wherein said one wall further includes a rib having opposite ends, one of said opposite ends defining said lower extent of said one wall.

\* \* \* \* \*